Patented Sept. 3, 1946

2,407,193

UNITED STATES PATENT OFFICE 2,407,193

RUBBER RECLAIM

Harry H. Thompson, Akron, Ohio, assignor to Wingfoot Corporation, Akron, Ohio, a corporation of Delaware No Drawing. Application March 6, 1942, Serial No. 433,673

3 Claims. (Cl. 260—714)

This invention relates to a method of reclaiming rubber and the production of a reclaim material which may be used under white rubber stocks such as white sidewall tire stocks without causing discoloration of the white covering layer.

According to this invention, oils and chemicals which cause dark stains to appear on a covering white stock are dissolved and removed from scrap rubber stock which has been subjected to a reclaiming process. The treatment is designed particularly to remove phenyl beta naphthylamine from the scrap rubber.

The scrap rubber is ground, devulcanized and dried in any usual manner, then before refining, the dried granular particles are cooked in a mixture of a swelling agent and a primary alcohol, for example, carbon tetrachloride and methyl alcohol, to dissolve out the oils and chemicals, etc. which cause discoloration or which have dissolved in them the materials which cause discoloration. The preferred mixture contains anywhere from 50 to 90% of carbon tetrachloride, and 50 to 10% of methyl alcohol. It may, for example, consist of 60% of carbon tetrachloride and 40% of methyl alcohol or 80% of carbon tetrachloride and 20% of methyl alcohol. The carbon tetrachloride serves to swell the rubber and thus aids in the action of the alcohol in dissolving the chemicals, etc. Instead of methyl alcohol any primary alcohol, such as ethyl alcohol, etc. may be used. Acetone can be employed but is not as satisfactory as methyl alcohol. Butyl alcohol is rather viscous but may be used.

The extraction of the discoloring matter is accomplished by cooking. The time of cooking may vary depending upon the temperature used, etc. Usually cooking for about 6 hours at 70–80° C. is sufficient to extract the objectionable material. Lower or higher temperatures, such as room temperature, etc. may be used, but the time of treatment may be adjusted accordingly.

After the cooking has been completed, the cooked stock is drained and then washed. The mixture used for the extraction is preferred for washing. The stock is then dried and refined by any usual procedure.

The following example will illustrate the invention: One thousand pounds of scrap rubber containing phenyl beta naphthylamine as antioxidant is ground, devulcanized by the alkali process (or any other standard procedure) and then dried. This is then cooked in 125 gallons of a mixture of 60% of carbon tetrachloride and 40% of methyl alcohol for 6 hours under a reflux condenser. The material is then drained, washed with 125 gallons of the mixed solvent, drained again and dried. This removes the phenyl beta naphthylamine and other objectionable oils and chemicals, etc. which would cause staining if the reclaim without undergoing such treatment were used under a white rubber stock, as for example, under the white rubber surface coating of a white sidewall tire. The stock, after drying, is refined by massing on regular mills and refining on standard reclaim machines.

I claim:

1. A process for preparing a non-staining reclaim rubber which comprises refluxing solid, alkali reclaimed rubber with a solvent mixture containing 50 to 90 percent of carbon tetrachloride, the remainder of the solvent mixture being methyl alcohol.

2. A process for preparing a non-staining reclaim rubber which comprises treating solid, devulcanized rubber with a mixture of carbon tetrachloride and methyl alcohol.

3. A process for preparing a non-staining reclaim rubber which comprises treating solid, devulcanized rubber with a mixture of carbon tetrachloride and a solvent selected from the class consisting of methyl alcohol, ethyl alcohol, butyl alcohol and acetone.

HARRY H. THOMPSON.